Patented Feb. 8, 1927.

1,616,900

UNITED STATES PATENT OFFICE.

GEORG KASSNER, OF MUNSTER, GERMANY.

PROCESS OF MANUFACTURING NITRIC ACID AND NITRIC-ACID SALTS.

No Drawing. Application filed March 24, 1924, Serial No. 701,422, and in Germany March 29, 1923.

My invention relates to improvements in the process of manufacturing nitric acid and nitric acid salts. More particularly my invention relates to the process in which nitric acid is produced by catalytic combustion of ammonia into nitrous gases. In this process as now practiced much ammonia is wasted by the formation of useless nitrogen, and in many modifications of the process the ammonia can be oxidized only to nitrogen oxid, by reason of the character of the catalyst, so that the nitrogen oxid must be transformed by secondary reaction by the admixed oxygen of the air into nitrogen dioxid which is transformed with water into nitric acid.

I have discovered that by means of a catalyst of a novel composition most of the ammonia can be directly transformed by the oxygen of the air into nitrogen dioxid, and that the condensation of the nitrogen dioxid with water and air into nitric acid is accelerated and requires smaller apparatus, as compared to the process in which at first mainly nitrogen oxid is produced. Further, I have found that in some cases nitrate can be directly obtained without any loss of ammonia. For smoothly transforming the ammonia into nitrogen dioxid or nitrate and avoiding loss of ammonia the temperature of the reaction, the composition and the velocity of the supply of the gaseous mixture, and, particularly the kind, quality and composition of the catalyst are important, and it is necessary that two material conditions be complied with, and that the catalyst be composed of two differently acting substances, viz, first, of pairs of substances which are adapted at successive stages of the oxidation at first readily to take up and thereafter to give off oxygen, and which act on each other by simultaneous reaction, so that they transmit the oxygen more energetically to the ammonia. Such pairs of elements are for example lead and manganese, lead and vanadium, lead and molybdenum, lead and chromium, lead and tungsten, lead and uranium, that is elements which in their highest stages of oxidation have acid properties and are adapted to combine with bases. The second component of the catalyst consists of substances, and more particularly bases, which are adapted at low temperature to bind the acid products of the ammonia in the form of salts and to give them off again at higher temperature, so that by the action of the said components the oxidation by catalysis is supported and the transformation is made more speedy and complete, for example by the formation and decomposition of nitrates.

I have found that such compounds or mixtures are particularly effective which contain the oxids of lead and manganese and an alkali earth metal. This composition which simultaneously contains the four elements: oxygen, alkali earth metal, lead and manganese, and the correct proportion of the said elements is important in my improved process. In the experiments made by me the best results have been obtained where in addition to oxygen the composition contained one atom of lead, one atom of manganese, and two atoms of alkali earth metal.

When mixtures of the said four components of my improved catalyst or suitable compounds thereof are heated, or when they are used for oxidizing ammonia, they are transformed into mixtures or compounds of plumbates of alkali earth metals with an oxid of manganese, or with manganite of an alkali earth metal, or with manganate of an alkali earth metal. Therefore, my improved catalyst may be composed from the beginning of the following compounds: first, calcium-ortho-plumbate and an oxid of manganese such as dioxid of manganese, oxid or protoxid of manganese or a mixture or compound of some or all of the said manganese oxids, second, calcium-metaplumbate, and calcium manganite or calcium manganate, third, barium-ortho-plumbate and an oxid of manganese, fourth, barium-meta-plumbate and barium manganite or barium manganate, fifth, strontium-orthoplumbate and an oxid of manganese, or, sixth strontium-meta-plumbate and strontium manganite or strontium manganate. In all of these examples the compounds of alkali earth metals may be replaced by equivalent amounts of other compounds of alkali earth metals, so that in some cases the catalyst contains two or three alkali earth metals. Therefore, broadly speaking, the preferred catalyst contains an alkali earth metal salt of the ortho-lead acid or of the meta-lead acid in mixture or combined with an oxid of manganese or with manganite of an alkali earth metal or manganate of an alkali earth metal. Also permanganates of an alkali earth metal can be used as components of the mixtures, in which case, however, a certain amount of alkali earth metal should be added in order to obtain the proper ratio of alkali earth metal and manganates.

In the manufacture of the catalyst it is not necessary at first to produce the said compounds of alkali earth metals in a pure state and to mix the proper amounts thereof with each other or with an oxid of manganese, but instead of the said pure compounds mixtures of all of such compounds of the said three or five elements, or mixtures of the elements themselves, may be used, provided that they are transformed, when glowing in air or when used in the process, into mixtures or compounds of the alkali earth metal salts of the lead acids with an oxid of manganese or with a manganite or a manganate of an alkali earth metal. Therefore, in lieu of the complete catalyst I may use mixtures of manganate of lead or plumbate of manganese with an alkali earth metal or with hydroxid of an alkali earth metal or with carbonate of an alkali earth metal, or I may use mixtures containing oxids or hydroxids, or peroxids or carbonates or nitrates of the said three or five elements viz, Pb, Mn, Ba, Ca, Sr. Even organic compounds of the said elements may be used in the manufacture of my improved catalyst, and furthermore the hydrogen or nitrogen compounds thereof, provided that enough air or oxygen is admitted for oxidizing, burning or vaporizing the combustible or volatile matter combined with the said three or five elements.

Suitable catalysts are composed as follows:

(a) 55 parts of barium ortho-plumbate ($Ba_2PbO_4$) and 10 parts of dioxid of manganese ($MnO_2H_2O$).

(b) 55 parts of barium ortho-plumbate and 14.5 parts of trioxid of molybdenum ($MoO_3$).

(c) 55 parts of barium ortho-plumbate with 6 parts of vanadic acid anhydrid ($V_2O_5$).

(d) 55 parts of barium ortho-plumbate and 24 parts of anhydrous tungstic acid ($WO_3$).

(e) 55 parts of barium ortho-plumbate with 55 parts of uranium trioxid ($UO_3$).

(f) 55 parts of barium ortho-plumbate and 10 parts of trioxid of chromium ($CrO_3$).

(g) 22.5 parts of oxid of lead, 40 parts of barium carbonate and 10 parts of dioxid of manganese ($MnO_2.H_2O$) are mixed and heated in air.

(h) 22.5 parts of oxid of lead, 53 parts of barium nitrate and 10 parts of dioxid of manganese ($MnO_2.H_2O$), the mixture being heated until the nitrous gases have been driven out.

By reason of the varying composition of the catalysts and the different action of their components on ammonia and oxygen the oxidation of the ammonia may be carried on at different temperatures in different ways, without causing any material loss by combustion of ammonia to nitrogen. In any mode of operation the process consists in conducting mixtures of ammonia and air or air and oxygen over the heated catalyst. The amount of oxygen should not be smaller than the amount corresponding to the formula: $NH_3 + 2O_2 = HNO_3 + H_2O$.

*First mode of operation.*—Intermittent operation: The process is carried out at a temperature of from 250 to 500° C., at which temperature the catalyst is hydrated by taking up water. The ammonia is directly oxidized into nitric acid, which acid is bound to the catalyst in the form of nitrate of an alkali earth metal. In the course of the process the amount of the said nitrate is preferably increased by continuously or periodically adding alkali earth metal or hydroxid of an alkali earth metal, and when the amount of the said nitrate is such that it can be advantageously separated or transformed into other products, I may proceed in different ways. In one mode of operation I interrupt the addition of a mixture of ammonia and air and I wash the nitrate from the part of the catalyst containing the same by means of water in order to obtain the same as such, or I decompose the same by raising the temperature of the catalyst, so that concentrated nitrous gases containing much nitrogen dioxid are obtained.

Now the catalyst which has thus been washed is dried and mixed with a suitable amount of alkali earth metal in order to compensate the loss caused by the formation of the nitrates and returned into the process, and also the catalyst which has not been washed and does not need any additions, and which is heated at higher temperature for the purpose of obtaining concentrated nitrous gases. In this way the process is continued by alternately producing nitrate by oxidation of ammonia and regenerating or decomposing the nitrate. The nitrate may also be separated from the catalyst by adding alkali metal carbonate in a proportion equivalent to the nitrate to the catalyst carrying the nitrate and thereafter washing the catalyst. Thereby alkali metal nitrate is obtained by washing while alkali earth metal carbonate remains in the catalyst. Thus the alkali earth metal needed in the catalyst is supplied thereto when afterwards heating the same in a current of air preparatory to the further oxidation of the ammonia.

*Second mode of operation.*—Continuous operation: The process is carried out at temperatures of from 500 to 750° C. From the ammonia, vaporized water and nitrous gases are obtained which are condensed with water and air into nitric acid. The amount of nitrogen dioxid and even nitric acid vapor in the hot gases is increased in the degree as the reaction temperature approaches the temperature at which the alkali earth metal nitrates are decomposed. In this respect my process is superior to processes heretofore proposed in which by the catalysis only lower nitrogen-oxygen compounds are obtained. The vapors of nitric acid contained in the hot gases of the reaction can be directly gathered without using liquid absorbing media by passing the hot gases through receptacles containing dry absorbing media such as potash, calcined soda, caustic lime, soda lime, and the like, whereby the corresponding nitrates are produced in the said receptacles. Thereafter the gases of the reaction, from which the nitric acid vapors have thus been removed by dry absorbing means, are submitted to wet absorption, by treating the same with water and air. If the dry separation of the nitric acid is not desired the mixture of all the products of the reaction is directly subjected to wet absorption.

*Example 1.*—55 parts of barium orthoplumbate ($Ba_2PbO_4$) are mixed with 10 parts of manganese dioxid ($MnO_2.H_2O$), 25 parts of water are added, and the powdery mass is dried and heated at a temperature of 350° C. while stirring in a current of a mixture of air and 7% of ammonia, until a test made shows 15% of barium nitrate. The mixture is now washed with water, whereupon the catalyst from which the barium nitrate has thus been removed is mixed with from 4 to 5 parts of powdery anhydrous barium hydrate and used again for oxidizing ammonia.

*Example 2.*—At first I proceed in the manner described in Example 1, until the catalyst shows 15% of barium nitrate. But instead of washing out the nitrate I raise the temperature to 600° C., whereby nitrous gases are developed, which are condensed. After the production of nitrous gases is finished the residue is moistened with water or steam, dried, and again treated at a temperature of 350° C. with a current of a mixture of air and 7% of ammonia, the process being repeated in the manner described above.

*Example 3.*—I mix 55 parts of barium ortho-plumbate ($Ba_2PbO_4$) with 10 parts of dioxid of manganese ($MnO_2.H_2O$), heat the mixture at a temperature of 600° C. and cause a mixture of air and 7% of ammonia to pass over or through the mixture. Thereby nitrous gases are produced which are collected and condensed, either by treating the same with water and air, or by first passing the same through dry absorbing media such as soda, powdered lime or the like and treating the remainder with water.

I am aware that catalysts have been proposed one described by Tessié du Mothay, in British Patent No. 491 of 1871 and which contains manganese of lead, permanganate of lead and dichromate of lead, and another one described by Ostwald in the patent of the United States No. 858,904 and containing oxids of lead, manganese, etc., all of which catalysts did not contain alkali earth metal, which alkali earth metal can not be replaced by alkali metals without seriously impairing the process and the result obtained thereby. Further, the relation between the successive reactions which is an important feature of my process is not found in the said prior processes. As a result of the said relation I am enabled to oxidize ammonia by continuous operation into nitrogen oxids, or by intermittent operation into nitrate. As far as I am aware this alternate effect obtained respectively by continuous or intermittent operation is not attained by means of any of the catalysts heretofore proposed.

I claim:

1. The herein described process of oxidizing ammonia, which consists in bringing ammonia and oxygen in contact with a heated catalyst containing lead, manganese, alkali earth metal and oxygen, and separating the nitrogen compound from the catalyst.

2. The herein described process of oxidizing ammonia, which consists in bringing ammonia and oxygen in contact with a heated catalyst containing lead, manganese, alkali earth metal and oxygen at the ratio of one atom of lead, two atoms of alkali earth metal, and one atom of manganese, and separating the nitrogen compound from the catalyst.

3. The herein described process of oxidizing ammonia, which consists in heating a catalyst containing lead, manganese, alkali earth metal and oxygen at a temperature not less than 250° C., bringing ammonia and oxygen in contact with the said heated catalyst, and separating the nitrogen compound from the catalyst.

4. The herein described process of oxidizing ammonia, which consists in heating a catalyst containing lead, manganese, alkali earth metal and oxygen at a temperature not less than 250° C. and not exceeding 500° C., bringing ammonia and oxygen in contact with the said heated catalyst, and separating the nitrogen compound from the catalyst.

5. The herein described process of oxidizing ammonia, which consists in heating a catalyst containing lead, a heavy metal having acid properties at the highest stage of oxidation, alkali earth metal, and oxygen at a temperature not less than 250° C. and not exceeding 500° C., bringing ammonia and oxygen in contact with the said heated catalyst, removing the nitrate thus produced, and adding an alkali earth metal to replace what was removed as a nitrate.

In testimony whereof I hereunto affix my signature.

GEORG KASSNER.